United States Patent
Patel (10) Patent No.: US 6,761,554 B2
(45) Date of Patent: Jul. 13, 2004

(54) ROTARY TABLETING PRESS

(75) Inventor: Naresh C. Patel, East Brunswick, NJ (US)

(73) Assignee: Leraj, Inc., East Brunswick, NJ (US)

(*) Notice: Subject to any disclaimer, the term of this patent is extended or adjusted under 35 U.S.C. 154(b) by 243 days.

(21) Appl. No.: 09/888,704

(22) Filed: Jun. 25, 2001

(65) Prior Publication Data

US 2002/0197347 A1 Dec. 26, 2002

(51) Int. Cl.[7] .............................................. B29C 43/08
(52) U.S. Cl. ........................ 425/345; 425/353; 425/408
(58) Field of Search ................................ 425/345, 193, 425/352, 353, 406, 408

(56) References Cited

U.S. PATENT DOCUMENTS

| | | |
|---|---|---|
| RE1,269 E | 2/1862 | Finken |
| 336,340 A | 2/1886 | Moree |
| 839,156 A | 12/1906 | Kliewer |
| 839,157 A | 12/1906 | Kliewer |
| 1,659,077 A | 2/1928 | Bishop |
| 1,846,999 A | 2/1932 | Eaton |
| 1,981,804 A | 11/1934 | Jones ............................ 25/9 |
| 2,077,979 A | 4/1937 | Baker ......................... 107/24 |
| 2,354,029 A | 7/1944 | Kingston ....................... 18/20 |
| 2,411,379 A | 11/1946 | Langhammer ................. 78/0.5 |
| 2,573,365 A | 10/1951 | Scholes et al. ................... 49/5 |
| 2,989,781 A | 6/1961 | Frank ............................. 18/20 |
| 3,537,137 A | 11/1970 | Lancesseur ................... 18/19 |
| 3,555,608 A | 1/1971 | Maekawa et al. ............. 18/20 |
| 3,674,393 A | 7/1972 | Busi ........................... 425/110 |
| 4,330,252 A | 5/1982 | Bullock et al. ............. 425/412 |
| 4,377,376 A | 3/1983 | De Santis .................... 425/78 |
| 4,403,935 A | 9/1983 | Crossley et al. ............ 425/210 |
| 4,943,227 A | 7/1990 | Facchini ..................... 425/345 |
| 5,071,607 A * | 12/1991 | Ayer et al. ................... 425/345 |
| 5,620,716 A | 4/1997 | Opitz ........................ 425/169 |
| 5,662,849 A | 9/1997 | Bogue et al. ............... 264/112 |
| 6,068,465 A | 5/2000 | Wilson ....................... 425/193 |
| 6,186,762 B1 * | 2/2001 | Matthes ...................... 425/345 |

* cited by examiner

*Primary Examiner*—Robert Davis
*Assistant Examiner*—Thu Khanh T. Nguyen
(74) *Attorney, Agent, or Firm*—Drinker Biddle & Reath LLP (57) ABSTRACT

A rotary tableting press includes a turret with upper and lower carousels in which upper and lower punch assemblies are removably supported. The upper and lower punch assemblies include punch casings having a central opening and a punch slidably received in the central opening of the casing. The upper and lower punches are normally biased away from one another. Rollers are positioned on the tablet press and adapted to engage the punches to direct the upper and lower punches toward one another to compress material placed between the punches to form a tablet.

20 Claims, 6 Drawing Sheets

ROTARY TABLETING PRESS

FIELD OF THE INVENTION

The present invention relates to a rotary press for manufacturing tablets and the like.

BACKGROUND OF THE INVENTION

In known presses for manufacturing tablets and the like, granular material is deposited from a feeder onto the upper surface of a die table for delivery of the material into die cavities carried by the die table. Upper and lower punches are positioned in aligned openings of upper and lower turret parts that are spaced on opposite sides of the die table. The turret portions and the die table are secured to a drive shaft for synchronous rotation of the turret portions and die table by the press. Track guides or cam structure supported by the press provide for reciprocation of the upper and lover punches to compress the material that has been deposited in the die cavities of the die table.

The upper and lower punches of prior art presses reciprocate in sliding contact directly with openings formed in the turret. This construction limits the punches that may be used in the press to those having relevant outer dimensions approximating the opening to provide for sliding contact between the punches and the turret portions. Furthermore, the repetitive reciprocation required by the sliding punches results in wear or other damage to the punches and to the surfaces of the turret parts that come into contact with the punches. Because the sliding contact surfaces receiving the punches are integral to the turret parts, damage to the sliding contact surfaces represents damage to the entire turret part.

The present invention provides removable punch assemblies for a rotary press in which the sliding surfaces for the punches are contained within the punch assembly. The inclusion of the sliding surfaces within removable punch assemblies provides for variation in the dimensions of applicable punches thereby leading to a more universal press. Also, the inclusion of the sliding contact surfaces within the removable punch assemblies allows different material to be used for the contact surface of the punch assembly as compared to the material selected for the turret portion. This provides for increased control over the portions of the punches and support structure which come into contact and are subject to wear or damage. Furthermore, when the sliding surfaces provided for one of the punches become worn or otherwise damaged, the inclusion of the sliding surfaces within removable punch assemblies allows for replacement of an individual punch assembly rather than replacement of an entire turret portion.

Additionally, conventional presses incorporate a separate die table located between the punch-carrying turret portions. The die tables carry the die cavities in which the material to be compressed is delivered by a feeder. This construction requires that the die table be secured to the drive shaft of the press or to one or both of the turret portions such that the die cavities and punches rotate synchronously.

The removable punch assemblies of the present invention eliminate the need for a separate die table. The punch assemblies include a die portion having a material chamber in which the material to be compressed is delivered. This construction provides for a more versatile and efficient assembly as compared with conventional tableting presses.

SUMMARY OF THE INVENTION

According to the present invention there is provided a rotary tableting press. The tableting press includes a turret rotatably supported by a housing and having upper and lower carousels. The upper and lower carousels have aligned openings in which upper and lower punch assemblies are removably supported. Each of the punch assemblies includes a punch casing and a punch member slidably received in an opening of the punch casing. The rotary tablet press further includes means to reciprocate the punches within the punch casings.

According to an embodiment of The invention the reciprocating means includes means for biasing the upper and lower punch members, the means for biasing upwardly biasing the upper punch members and downwardly biasing the lower punch members. Rollers supported by the housing engage the punches to direct the upper and lower punches toward each other to form a tablet through compression of material located between the punches.

According to an embodiment of the present invention, the central opening in each of the lower casings consists of a central bore having a terminal end and each of the casings includes a removable die portion extending from the terminal end of the bore to an end of the casing. The die portion includes an opening defining a material chamber extending through the die portion.

According to another embodiment of the present invention, each of the upper and lower punch members includes mold recesses. The mold recesses are positioned such that the upper and lower mold recesses are brought into an intimate confronting relationship as, the punch members engage the cam structure to form a tablet through compression of material which has been placed between the mold recesses.

The foregoing and other features and advantages of the present invention will become more apparent in light of the following detailed description of the preferred embodiments discussed below and as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE DRAWINGS

Figure 1:
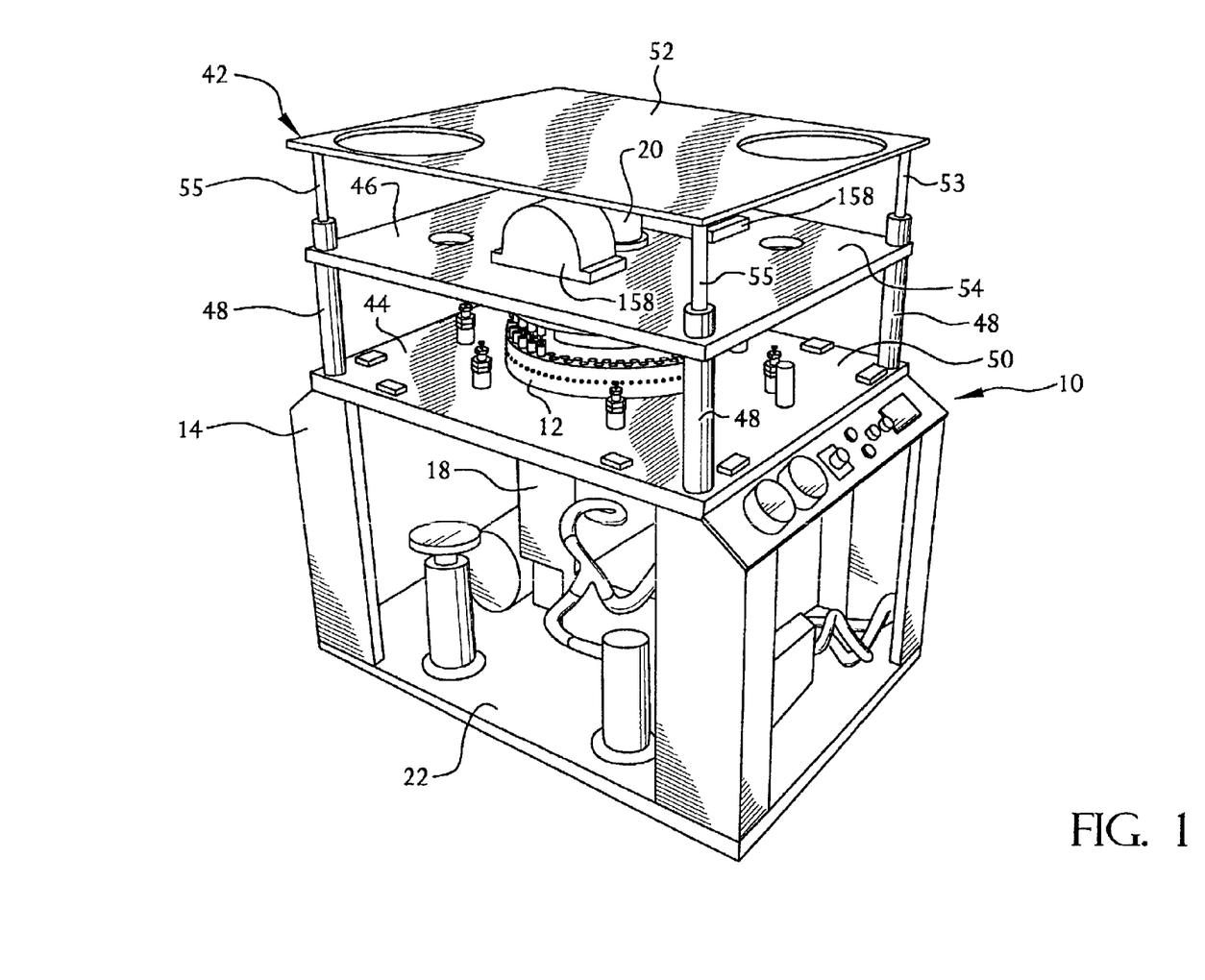
FIG. 1 is a perspective view of a rotary tableting press according to the present invention.
Figure 3:
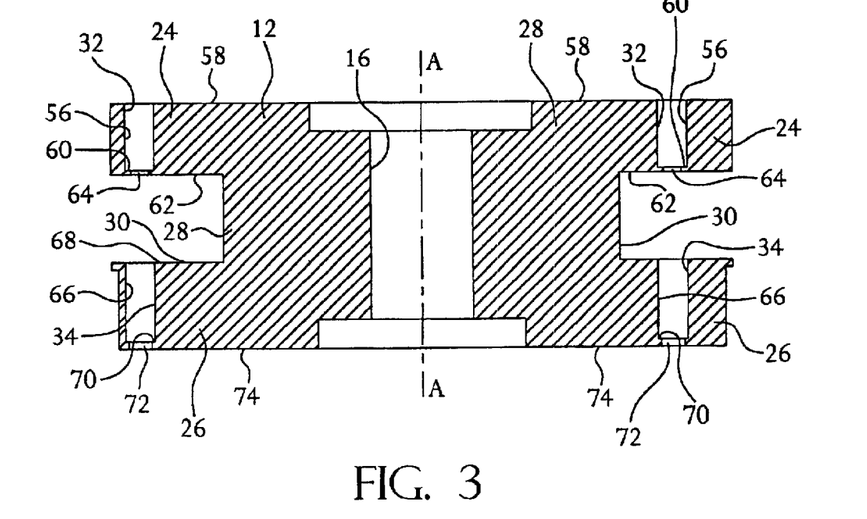
FIG. 3 is a sectional view taken along the lines III—III in FIG. 2.

Referring to the drawings, where like numerals identify like elements, there is illustrated in FIG. 1 a rotary press 10 according to the present invention for forming tablets and the like. The rotary tableting press includes a turret 12 that is supported for rotation in a housing structure 14. The turret 12, as seen in FIG. 3, has a central opening 16 that provides access for a drive shaft 20. A motor 18 engages the drive shaft 20 to rotate the turret 12 about a central axis A—A. The motor 18 is preferably supported on a base portion 22 of the housing structure 14 beneath the turret 12.

Figure 2:
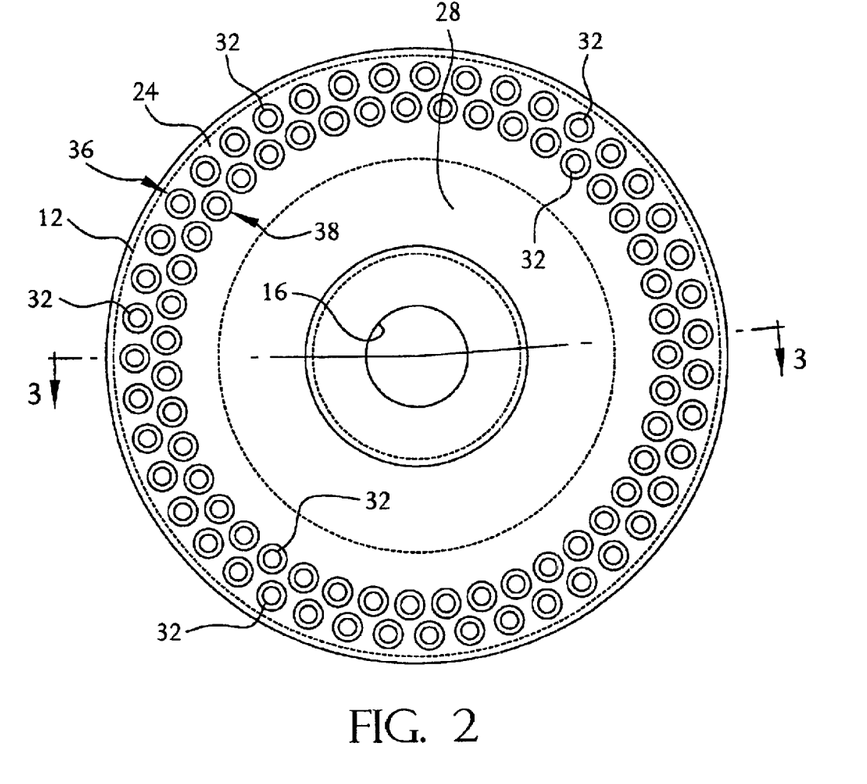
FIG. 2 is a top plan view of the turret of the rotary tableting press of FIG. 1.
Figure 2A:
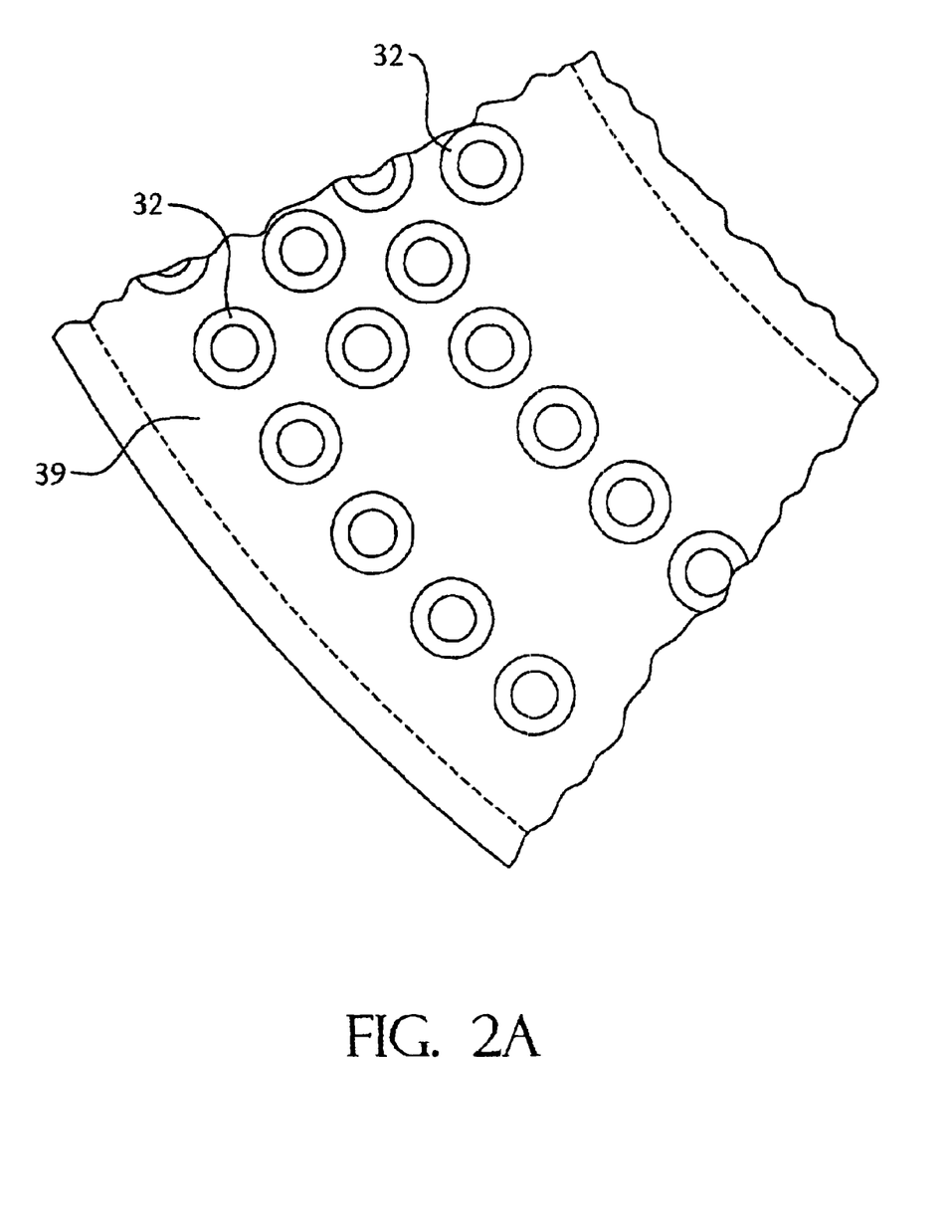
FIG. 2A is a partial top plan view of a turret having an alternative arrangement of openings.

The turret 12 includes upper and lower carousels, 24 and 26 respectively, (shown in FIG. 3) for supporting tablet molding punch assemblies which will be described in greater detail below. The carousels 24, 26 extend annularly around a central disk portion 28 at an outer peripheral portion of the turret 12 and are separated from one another on opposite sides of channel 30. Each of the upper and lower carousels 24, 26 includes a plurality of openings 32, 34 which are positioned such that each of the openings 32 in the upper carousel 24 is vertically aligned with one of the openings 34 in the lower carousel 26. As best seen in FIG. 2, the openings 32, 34 are arranged in two rows 36, 38 of openings to form concentric rings of openings such that the position of each of the openings 32, 34 in row 36 is offset from the position of adjacent openings in row 38. This arrangement of openings provides space saving efficiency allowing for placement of additional openings, and therefore additional punch members, in the available space provided by the carousels for the support of punch members. In FIG. 2A, a portion of an upper carousel 39 of an alternative production unit is shown. The alternative production unit provides for additional openings 32 through the inclusion of four rows of openings 32 in the upper carousel 39.

The turret 12 is shown in the figures as a unitary construction in which the outward projecting carousels 32, 34 are integral with the central disk portion 28. However, it is also contemplated that the turret may be formed as an assembly having separate upper and lower plate portions containing the annularly extending carousel portions which are positioned on opposite sides of a central spacing member to create a space between the carousels.

Referring again to FIG. 1, the housing structure 14 includes a tiered assembly 42 that is supported atop the base portion 22. The tiered assembly 42 includes lower and upper plate members 44, 46 that are spaced from each other by support columns 48 to form a lower compartment 50. The motor drive shaft 20, shown extending through the tiered assembly 42, supports the turret 12 for rotation within the lower compartment 50. As will be described in greater detail, the lower and upper plate members 44, 46 provide reaction surfaces for actuated reciprocation of punch members. The tiered assembly 42 further includes a cover plate 52 supported above upper plate member 46 by columns 53 to form an upper compartment 54 in which an upper portion of the motor drive shaft 20 extends.

Referring to FIG. 3, each of the openings 32 in the upper carousel 24 includes a first large diameter portion (or bore) 56 extending from an upper surface 58 nearly through the thickness of the upper carousel 24. An opposite terminal end of the large diameter portion 56 defines a supporting surface 60 adjacent a lower surface 62 of the upper carousel 24. A second smaller diameter portion (i.e., hole) 64 of the opening 32 extends from the lower surface 62 to communicate with the larger diameter portion 56. In a similar fashion, each of the openings 34 in the lower carousel 26 has a large diameter portion (or bore) 66 extending from an upper surface 68 of carousel 26 to an opposite terminal end of the larger diameter portion 66 which defines a support surface 70. A smaller diameter portion 72 extends from a lower surface 74 of the lower carousel 26 to communicate with the larger diameter portion 66.

Figure 4:
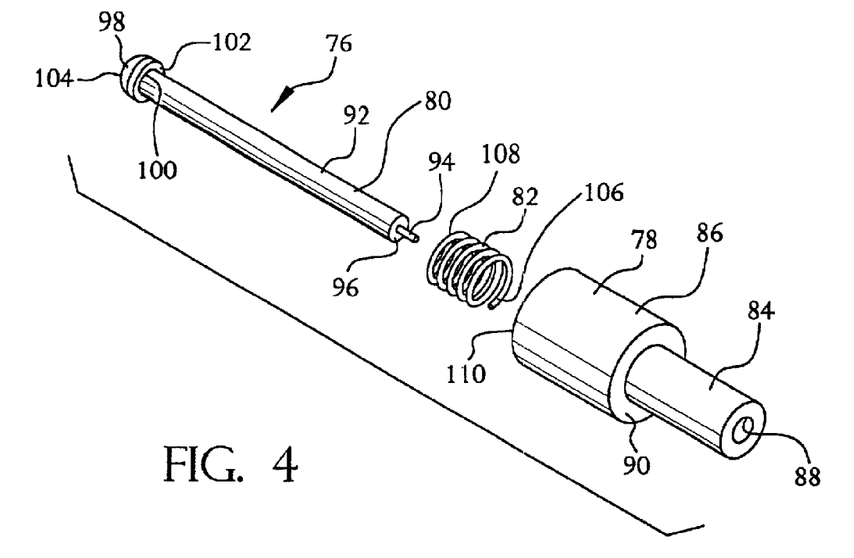
FIG. 4 is an exploded perspective view of an upper punch assembly of the rotary tablet press of FIG. 1.
Figure 5:
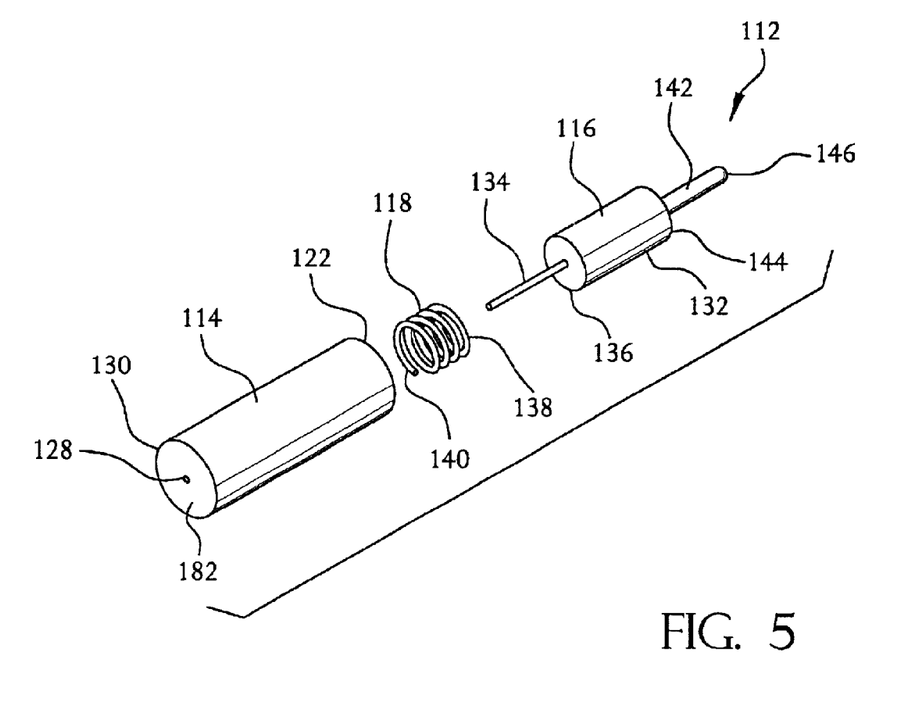
FIG. 5 is an exploded perspective view of a lower punch assembly of the rotary tablet press of FIG. 1.
Figure 6:
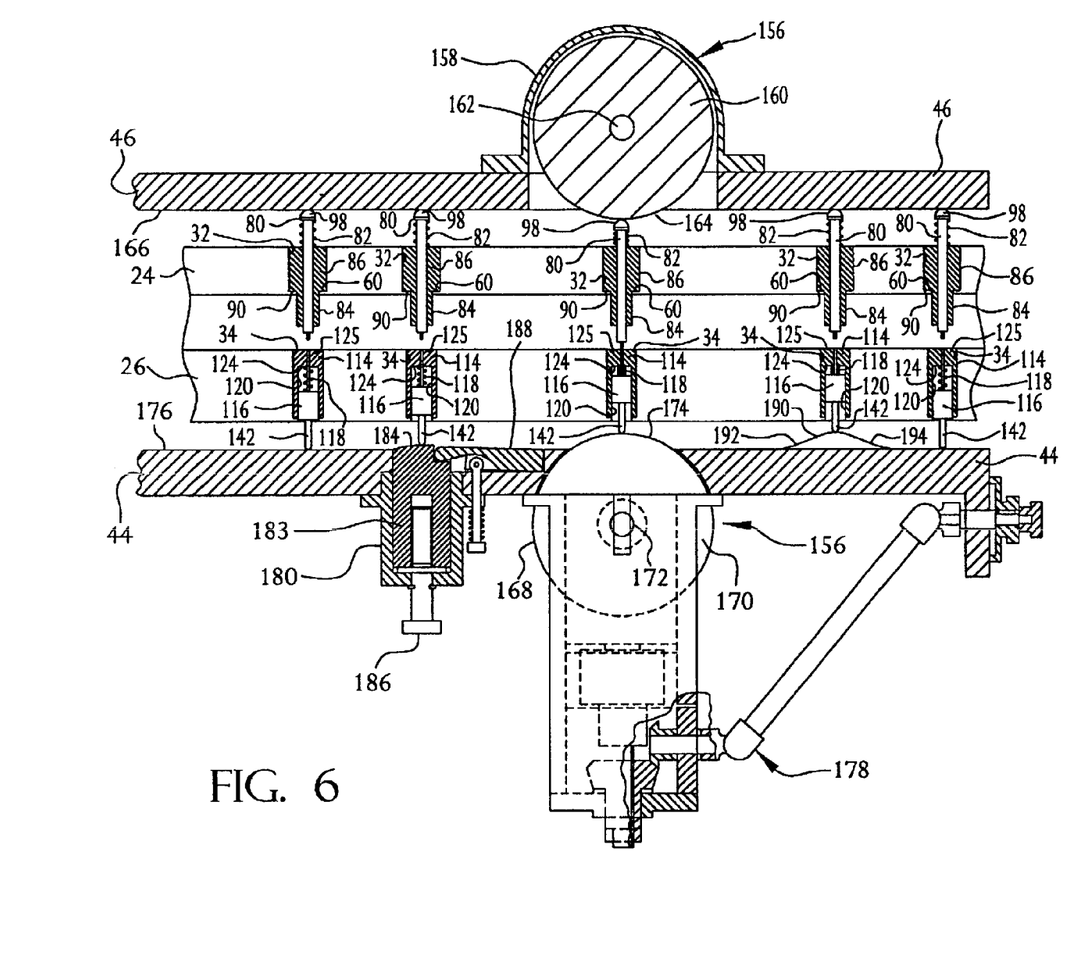
FIG. 6 is a partial elevational schematic view of the rotary tableting press of FIG. 1 in which curvature of the tableting press is removed for clarity to illustrate the press in the plane of the figure.

Referring to FIGS. 4–6, as discussed above, the rotary tableting press 10 includes upper punch assemblies 76 that are removably inserted into the openings 32 in the upper carousel 24. Each upper punch assembly 76 includes a casing 78, a punch member 80 and a spring 82. Each of the upper casings 78 includes first and second portions 84, 86 and a central opening 88 extending through the first and second portions to provide an internal channel or contact surface for sliding and supporting one of the punch members 80 in casing 78. The first portion 84 of each upper casing 78 has an outer diameter which is smaller than the outer diameter of the second portion 86 such that an annular support ledge 90 is formed by the second portion 86. As shown in FIG. 6, each of the upper casings 78 is removably received in one of the openings 32 of the upper carousel 24. The annular ledge 90 is supported on the supporting surface 60 such that the first portion 84 of the casing 78 extends beyond the lower surface 62 of the upper carousel 24.

Each of the upper punch members 80 includes an elongated body portion 92 which is slidably received within the central opening 88 of one of the upper casings 78 for sliding contact between the elongated body portion 92 and central opening 88. Each upper punch member 80 further includes a mold projection 94 which extends from an end 96 of the body portion 92 and a stop 98 located at an end 100 of the body portion 92 which is opposite mold projection 94. Each stop 98 includes an annular surface or retention flange 102 preferably having a diameter (or width dimension) that is larger than the diameter of the body portion 92 for engaging spring 82. Each stop 98 further includes preferably a rounded surface 104 opposite the annular surface 102. The preferred rounded surface is designed to contact the upper plate 46 of housing structure 14 and other structures associated with the press 10. As such, a rounded surface minimized friction between the upper punch member 80 and the housing.

Each of the upper springs 82 is positioned on the body portion 92 of one of the upper punch members 80 and has a first end 106 contacting an upper surface 110 of the punch casing 78 in which the punch member 80 has been slidably received. An opposite end 108 of the spring 82 contacts the annular surface 102 of the punch member 80. As a result, the spring 82 biases the punch member 80 upwardly with respect to the casing 78 and, thus, the upper carousel 24.

The rotary tableting press 10 further includes lower punch assemblies 112 removably received in the openings 34 in the lower carousel 26. Similar to the upper punch assemblies 76, each of the lower punch assemblies 112 includes a casing 114, a punch member 116 and a spring 118. Each of the lower punch casings 114 includes an elongated central bore 120 which defines a cavity for slidingly receiving one of the punch members 116 within casing 114. The side walls of the cavity provide a sliding contact surface for the punch member 116. The central bore 120 extends from an end 122 of the casing to a terminal end of the bore that defines a reaction surface 124 for retaining the spring 118 (see FIG. 7).

Each of the lower punch casings 114 also includes a die portion 125 which extends from the terminal end of the central bore 120 to an end 130 of the casing 114. An opening or channel 128 extends through the die portion 125 and communicates with the central bore 120. The channel defines a chamber for receiving material that forms the tablet.

The inclusion of the sliding surfaces required by the upper and lower punches 80, 116 within the removable punch assemblies 76, 112 provides for more universal punch selection as well as enhanced control and maintenance of the punches which are selected for use with the rotary press 10. Because the sliding surface is provided within a removable assembly, the diameter of the sliding surface is not fixed by the size of the openings 32, 34 in the upper and lower carousels 24, 26. The present invention allows for variation in the sliding portion of the punches selected for use in the rotary press 10 without the need for further machining or replacement of the carousels 24, 26.

Furthermore, the inclusion of the contact surfaces in the casings 78, 114 of the removable punch assemblies 76, 112 allows different material to be used to make the casings than the carousels 24, 26. As such, it is possible to select material for the casings which facilitate reciprocation of the punch members, while selecting material for the carousels that is better designed to support the anticipated loads. This variation in material properties for the punch is possible irrespective of the size of punch.

The inclusion of the contact surface for the punches within removable assemblies 76, 112 further provides for replacement of an individual assembly having a worn or damaged contact surface rather than replacement of the entire carousel 24, 26.

Each of the lower punch members 116 includes a cylindrical body portion 132 which is received in the central bore 120 of one of the casings 114. Each lower punch member 116 further includes an elongated mold shaft 134 projecting from an end 136 of the body portion 132 and which is adapted to be slidably received in the material chamber 128 of the die portion 125 of punch casing 114.

As is apparent from the figures, the spring 118 is positioned on the mold shaft 134 such that the spring 118 will be located within the central bore 120 of the lower punch casing 114. Each of the springs 118 has a first end 138 contacting the end 136 of the body portion 132 and a second end 140 contacting the reaction surface 124 of the casing 114. The spring 118 is preferably a compression spring which acts to downwardly bias the lower punch member 116 with respect to the lower carousel 26 in which the lower punch assemblies 112 are removably received. Each of the punch members 116 includes an elongated follower 142 extending from an end 144 of the body portion 132.

Each of the lower punch assemblies 112 is removably inserted into one of the openings 34 in the lower carousel 26 such that the end 122 of the lower casing 114 is supported on the support surface 70. The elongated followers 142 of the lower punch assemblies 112 extend from the lower carousel 26 and have rounded ends 146 adapted to slidingly contact the lower plate 44 of housing structure 14 during operation.

Figure 8:
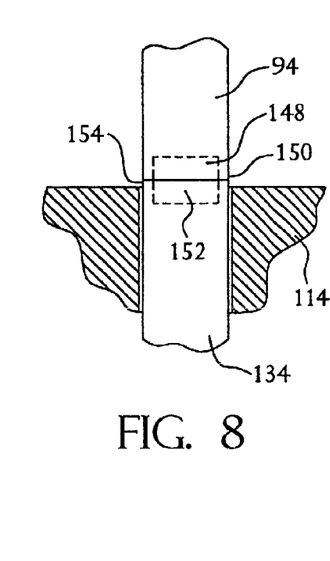
FIG. 8 is an enlarged view taken from FIG. 7.

As seen in FIG. 8, each of the mold projections 94 of the upper punch members 80 includes a mold recess 148 formed in an end 150 of the mold projection 94 opposite the body portion 92. Similarly, each of the mold shafts 134 of the lower punch members 116 includes a mold recess 152 formed in an end 154 of the mold shaft 134 opposite the body portion 132. The mold recesses 148 of the upper punch members 80 are most preferably similar in size and shape to the mold recesses 152 of the lower punch members 116. The mold recesses 148 of the upper punch members 80 cooperate with the mold recesses 152 of the lower punch members in a confronting relationship shown in FIG. 8. Compression of material delivered to the material chamber 128 of casing 114 as the mold recesses approach each other forms tablets in the manner to be described. The inclusion of the die portions 125 in the casings 114 of lower punch assemblies 112 allows for the elimination of a separate die table. In addition to savings in material costs, this provides for the elimination in the need for securement of the separate die table to either the drive shaft 20 or the turret 12 of the rotary press 10.

As described previously, the construction of the upper and lower punch assemblies 76, 112 provides for upward biasing of the upper punch members 80. The biasing results in contact between the stops 98 and upper plate 46 of housing structure 14 and for downward biasing of lower punch members 116 for contact between the elongated follower 142 and lower plate 44 of housing structure 14. The rounded surfaces 104, 146 of the stop 98 and follower 142 facilitate sliding contact between the punch members 80, 116 and plates 46, 44 respectively, as the turret 12 is rotated by drive motor 18.

Referring now to FIG. 6, the rotary tableting press 10 also includes upper and lower roller assemblies 156 mounted to the plates 44 and 46 of housing structure 14. The roller assemblies 156 produce the reciprocating actuation of the upper and lower punch members 80, 116 within the upper and lower carousels 24, 26 respectively. The press preferably includes two upper roller assemblies mounted on opposite sides of the upper plate 46. Each upper roller assembly includes an upper roller housing 158 mounted to the upper plate 46. An upper roller 160 is mounted within the housing 158 at a central axis of the roller such that a peripheral portion 164 of the roller 160 extends past the lower surface 166 of upper plate 46. It is preferable that the roller be fixed against rotation about the central axis. However, fixation of roller is not a requirement. The lower projecting portion 164 of the roller 160 thus forms a cam surface which is located to come into contact with the stops 98 of each of the upper punch members 80 as the turret 12 is rotated.

As the stop 98 of a punch member 80 engages the arcuate peripheral projecting portion 164 of the roller 160, the punch member is first driven downwardly until the punch member reaches the center 162 (apex) of the roller 160. After passage of the punch member 80 beyond the center 162, resilient action of the spring 82 which engages the annular surface 102 of the punch member 80 urges the punch member upwardly into contact with the surface 166 of upper plate 46.

There are also preferably two lower roller assemblies 156 mounted on opposite sides of the lower plate 44 on the rotary tableting press 10. Each lower roller assembly includes a lower roller housing 168 and a roller 170 mounted at a center 172 to the roller housing 168 such that a peripheral portion 174 of the lower roller 170 projects upward beyond the upper surface 176 of lower plate 44. Similar to the upper rollers 160, it is preferable although not required that the lower rollers 170 be fixed against rotation. Accordingly, as the followers 142 of the lower punch assemblies 112 slide along the upper surface 176 of the lower plate 44 they come into contact with the lower roller 170. The projecting portion of the roller urges the lower punch member upward, compressing the spring 118 and driving the lower mold recess upward toward the upper mold recess 148. When the follower passes the apex of the lower roller 170, the spring 118 biases the lower punch member 116 downward and away from the lower carousel.

The preferred embodiments of the various figures show the use of springs 82 for upwardly biasing the upper punch members 80 and springs 118 for downwardly biasing the lower punch members 116. However, the invention is not limited to the use of springs. Any means for biasing the punch members 80 and 116, including pneumatic and hydraulic actuation for example, has potential application to the present invention.

As seen in FIG. 6, the centers 162 of upper rollers 160 are substantially aligned with the centers 172 of the lower rollers 170. As the punch members 80, 116 are driven toward the centers, the mold recesses 148, 152 of the upper and lower punch members 80, 116 are driven toward one another as shown in FIG. 8. To allow for adjusting of the mating of the mold recesses, the lower rollers 170 are mounted to an adjustment mechanism 178 which permits vertical adjustment of the amount that the lower rollers 170 project above the upper surface 176 of lower plate 44.

The rotary tableting press 10 further includes one or more tablet weighting stations 180 supported by the lower plate 44 of the housing structure 14. The weighting stations control the measuring of a predetermined amount of material 181 into the material chambers 128 of lower punch casings 114. A conventional material dispenser, not shown, precedes the tablet weighting stations 180 and deposits material onto the upper surface 68 of lower carousel 26 such that the material 181 enters into, and overfills, the material chambers 128 beyond the surface 182 of casing 114. See FIG. 7A. The tablet weighting station 181 includes a doser 183 having an upper surface 184. As a lower punch assembly 112, which has been filled with material 181 by a dispenser, enters the tablet weighting station 180, the follower 142 of the lower punch member 116 contacts the upper surface 184 of the doser 183. The upper surface 184 of doser 183 positions the punch member 116 at a predetermined position with respect to the material chamber 128 of punch casing 114. A conventional scraper, not shown, removes excess material from surface 182 of casing 114 resulting in the arrangement shown in FIG. 7B.

Figure 7A:
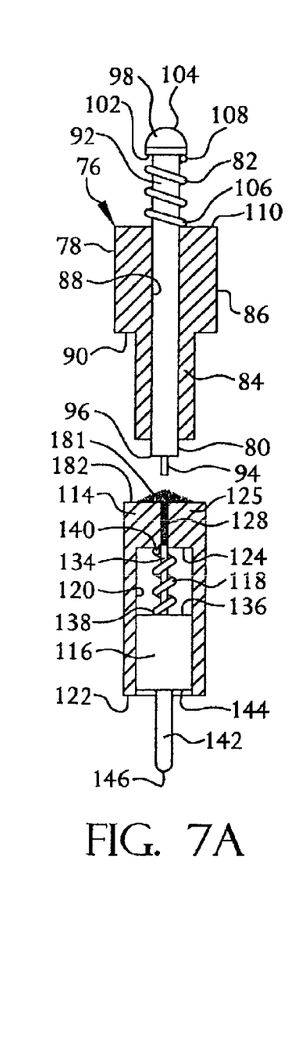
FIG. 7 is a schematic illustration of the upper and lower punch assemblies of the rotary tableting press at various stages of the tableting process.
Figure 7B:
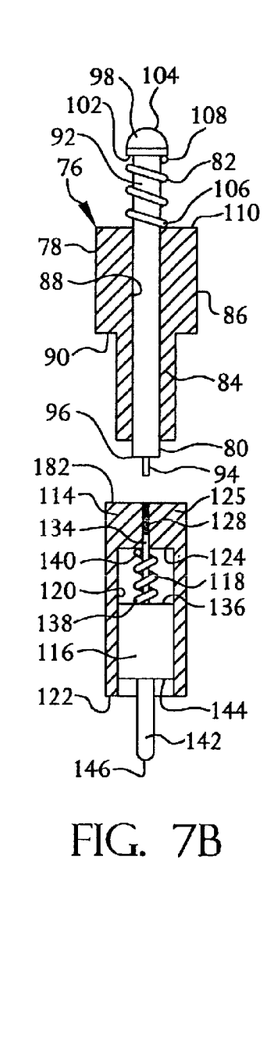
Figure 7C:
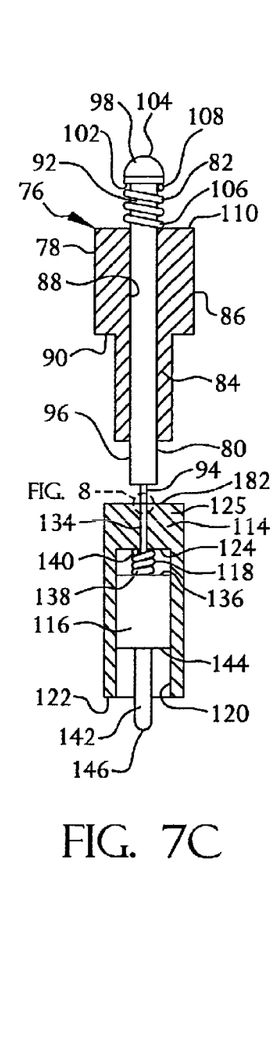

The tablet weighting station 180 also includes an adjustment mechanism 186 for adjusting the position of the doser 183 with respect to the upper surface 176 of lower plate 44. Each of the tablet weighting stations 180 includes a wedge 188 for maintaining the position of the doser set by the adjustment mechanism 186. The punches containing metered material engage the upper and lower rollers 160, 170 to bring the mold recesses into the confronting relationship to compress the material as shown in FIG. 7C and FIG. 8.

Figure 7D:
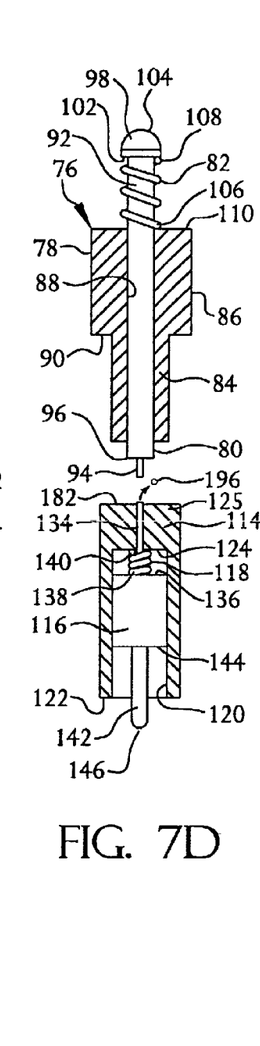
Figure 7E:
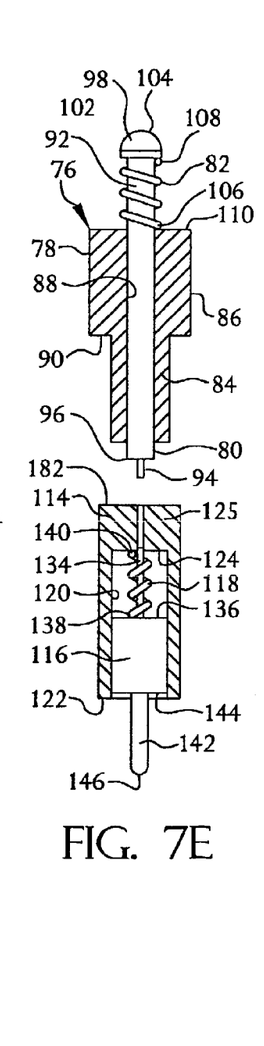

The rotary tableting press 10 further includes ejection cams 190, each of which extends upwardly from surface 176 of lower plate 44. The ejections cams 190 are positioned to contact the followers 142 of lower punch members 116 after the punch members have been driven past one of the pairs of upper and lower rollers 160, 170. Each of the ejection cams 190 includes ramped portions 192 and 194. Ramped portion 192 provides for extension of a lower punch member 116 beyond surface 182 of casing 114 to eject a molded tablet 196 from the lower punch casing 114 as shown in FIG. 7D. Ramped portion 194 provides for the return of the follower 142 of lower punch 116 and contact with the surface 176 of plate 44 as shown in FIG. 7E.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the recitation of the appended claims.

What is claimed is:

1. A rotary tableting press comprising:

a turret supported for rotation about an axis, said turret including an upper carousel and a lower carousel each having a plurality of openings, the openings in said upper carousel being vertically aligned with associated openings in said lower carousel;

a plurality of upper and lower punch casings, each of said punch casings having a central opening and being removably received in one of the openings of said upper and lower carousels;

a plurality of upper and lower punch members, at least a portion of each of said upper and lower punch members being slidably received for reciprocation in the central opening of one of said upper and lower punch casings, each of said upper and lower punch members including a mold recess at a terminal end thereof; and means for reciprocating said upper and lower punches with respect to said upper and lower casings.

2. The rotary tableting press according to claim 1 wherein said reciprocating means comprises upper and lower rollers supported by corresponding upper and lower fixed plates, said upper and lower rollers positioned and oriented to engage a first end of said upper and lower punch members to direct said upper and lower punch members toward one another.

3. The rotary tableting press according to claim 2 wherein said reciprocating means further comprises means for biasing the upper and lower punch members, said means for biasing upwardly biasing the upper punch members and downwardly biasing the lower punch members.

4. The rotary tableting press according to claim 1 wherein the central opening in each of said lower punch casings includes a bore extending to a terminal end, and wherein each of said lower punch casings includes a die portion extending from the terminal end of said bore to an end of said casing, and an opening defining a material chamber extending through said die portion and communicating with said bore, and wherein each of said lower punch members includes a central body portion slidably received in said bore and a mold shaft extending from one end of said body portion, at least a portion of said mold shaft being slidably received in the material chamber of said die portion, and wherein reciprocation of each of said lower punch members by said means for reciprocating results in retraction of at least an end portion of the mold shaft of said lower punch member from a terminal end of the associated material chamber, thereby providing for receipt of a tablet material within the material chamber.

5. The rotary tableting press according to claim 1 wherein the openings in said upper and lower carousels are arranged in at least two concentric rows of openings in an outer peripheral portion of said upper and lower carousels.

6. The rotary tableting press according to claim 4 wherein each of said upper punch members includes a mold projection extending from one side of a central body portion, and wherein the mold recess of said upper punch member is included in the mold projection and wherein the mold recess of each of said lower punch members in included in the mold shaft of said lower punch member, the upper and lower mold recesses positioned such that they are brought into intimate confronting relationship during said reciprocation of said punch members, the reciprocation of the punches causing material between the mold recesses to compress to form a tablet.

7. The rotary tableting press according to claim 6 wherein the upper and lower mold recesses are substantially similar in size and shape.

8. The rotary tableting press according to claim 2 wherein each upper roller includes an arcuate surface which projects below a lower surface of the upper plate, and wherein each lower roller includes an arcuate surface which projects above an upper surface of the lower plate.

9. The rotary tableting press according to claim 2 wherein each of the upper and lower rollers is fixed against rotation and wherein the center of each of said upper rollers is in substantial alignment with the center of one said lower rollers.

10. The rotary tableting press according to claim 6 wherein the body portion of each upper punch extends above an upper surface of the upper punch casing, the body portion having an upper end with a retention flange, wherein the means for biasing includes a first resilient member contacting the retention flange and the upper surface of the upper punch casing to bias the upper end of the upper punch member away from the upper punch casing, and a second resilient member located between the central body portion of the lower punch member and the lower punch casing for biasing the central body portion of the lower punch member away from the lower punch casing.

11. The rotary tableting press according to claim 10 wherein each of said second resilient members is a spring located within the central opening of one of said lower punch casings.

12. The rotary tableting press according to claim 6 wherein the confronting relationship between the mold recesses in said upper and lower punch members occurs adjacent to an upper surface of said lower carousel.

13. The rotary tableting press according to claim 10 further including a fixed lower plate mounted below the lower carousel, the lower plate having at least one ejection cam formed on an upper surface, the ejection cam projecting upwardly from the upper surface of the lower plate and adapted to contact a follower formed on and extending downward from the central body portion of the lower punch member, the contact between the ejection cam and the follower forcing the mold shaft of the lower punch member to eject the tablet from the lower punch casing.

14. The rotary tableting press according to claim 13 further comprising at least one tablet weighting station for metering a preselected amount of material to be molded in the material chamber of said lower punch casings, said tablet weighting station including a doser supported by said tablet weighting station such that an upper surface of said doser is located adjacent the lower plate of said tableting press for contact with said follower of said lower punch members, said tablet weighting station including an adjustable support for adjustment of the position of the upper surface of said doser with respect to the lower plate.

15. The rotary tableting press according to claim 8 wherein the support of at least one of said upper and lower rollers by said tableting press is adjustable such that the distance which the arcuate surface projects from the plate may be varied.

16. The rotary tableting press according to claim 3 wherein the upper end of the upper punch member is rounded and adapted to slide along the lower surface of the upper plate, and wherein the lower end of the follower is rounded and adapted to slide along the upper surface of the lower plate.

17. A rotary tableting press comprising:

a turret having upper and lower portions rotatably supported by said tableting press each having a plurality of openings such that each of the openings in said upper portion is aligned with one of the openings in said lower portion;

a plurality of upper and lower punch assemblies each comprising a punch casing removably received in one of the openings in said upper and lower turret portions and having a central opening defining a punch contact surface, each upper and lower punch assembly further comprising a punch received in the central opening of said punch casing for sliding contact between said punch and the punch contact surface of said punch casing, each of said upper and lower punches including a mold recess at a terminal end thereof; and means for reciprocating said upper and lower punches with respect to said upper and lower punch casings.

18. The rotary tableting press according to claim 17 wherein said reciprocating means comprises upper and lower rollers supported by said tableting press, said upper and lower rollers positioned and oriented to engage a first end of said upper and lower punches to direct said upper and lower punches towards one another, and wherein said reciprocating means further comprises means for biasing said upper and lower punches, said means for biasing upwardly biasing said upper punch members into contact with an upper plate and downwardly biasing said lower punch members into contact with a lower plate.

19. A system for supporting punches in a rotary tableting press, said system comprising:

a turret comprising upper and lower portions rotatably supported by said tableting press, each portion having a plurality of openings such that each of the openings in said upper portion is aligned with one of the openings in said lower portion;

a plurality of upper and lower punch casings removably received in one of the openings in said upper turret portion and having a central opening defining a punch contact surface, each upper and lower punch casing receiving a punch for sliding contact between said punch and the punch contact surface of said punch casing, each of said punches including a mold recess at a terminal end thereof; and means for reciprocating said punches within with respect to said upper and lower punch casings.

20. The system according to claim 19 wherein the central opening in each of said lower punch casings includes a bore having a terminal end and wherein each of said punch casings includes a die portion extending from the terminal end of said bore to an end of said casing, said die portion having an opening defining a material chamber extending through said die portion and communicating with said bore.

* * * * *